United States Patent [19]

Davenport

[11] Patent Number: 5,070,909

[45] Date of Patent: Dec. 10, 1991

[54] LOW RECOVERY ROTARY CONTROL VALVE

[76] Inventor: Robert G. Davenport, 23003 Willowcreek Stables Rd., Spring, Tex. 77389

[21] Appl. No.: 536,216

[22] Filed: Jun. 11, 1990

[51] Int. Cl.$^5$ .................. F16K 5/10; F16K 47/04
[52] U.S. Cl. .................. 137/625.32; 251/127; 251/315
[58] Field of Search .................. 137/125.32; 251/127, 251/315

[56] References Cited

U.S. PATENT DOCUMENTS

| | | |
|---|---|---|
| 3,630,229 | 12/1971 | Nagel et al. . |
| 3,665,965 | 5/1972 | Baumann . |
| 3,693,659 | 9/1972 | Parola . |
| 3,704,726 | 12/1972 | Lewis . |
| 3,722,854 | 3/1973 | Parola . |
| 3,773,085 | 11/1973 | Caldwell, Jr. . |
| 3,776,278 | 12/1973 | Allen . |
| 3,813,079 | 5/1974 | Baumann et al. . |
| 3,826,281 | 7/1974 | Clark . |
| 3,880,191 | 4/1975 | Baumann ............ 137/625.32 |
| 3,880,399 | 4/1975 | Luthe . |
| 3,941,350 | 3/1976 | Kluczynski . |
| 3,978,891 | 9/1976 | Vick . |
| 3,990,475 | 11/1976 | Myers . |
| 4,212,321 | 7/1980 | Hulsey . |
| 4,364,415 | 12/1982 | Polon . |
| 4,479,510 | 10/1984 | Bey . |
| 4,665,946 | 5/1987 | Hulsey . |
| 4,889,163 | 12/1989 | Engelbertsson ............ 137/625.32 |

FOREIGN PATENT DOCUMENTS 0325846 11/1988 European Pat. Off. .

OTHER PUBLICATIONS

Neles; Noise Prediction for Q-Ball with Downstream Diffusor.
Neles; Q-Ball Trim Alternatives; 5/86.
Neles; Q-Ball Standard Product Range; 5/86.
Preliminary: Neles Q-Ball 8/87.

Primary Examiner—Arnold Rosenthal
Attorney, Agent, or Firm—Sue Z. Shaper

[57] ABSTRACT

A rotary control valve for controlling fluid flow through a conduit comprising at least one fixed trim element and a rotatable plug element located in the conduit in closely abutting position. The trim element and the plug element have a plurality of ducts extending therethrough. The plug element has at least one transverse duct communicating between at least two of the plurality of ducts. The opening of the ducts on the inside face of the trim registers with the opening of the ducts on a face of the plug.

16 Claims, 9 Drawing Sheets

LOW RECOVERY ROTARY CONTROL VALVE

The invention described herein may be manufactured and used by or for the Government of the United States of America for governmental purposes without the payment of any royalties thereon or therefore.

FIELD OF THE INVENTION

This invention relates to low recovery rotary control valves for throttling fluid flow through a conduit.

BACKGROUND OF THE INVENTION

A number of embodiments of fluid control valves exist, forming a large body of valve art. The particular device that is the subject of this invention is a further development of rotary control valves.

A ball valve is a rotary control valve, comprised generally of a body, a rotating plug, seats, a bonnet, bearings, and seals. The assembly is placed in a conduit and used to control the flow of fluid, liquid or gas, through the flow bore. The components operate together such that the ball (a form of plug), usually rotating through 90°, can move from a full open (maximum flow through valve) position to a full closed (minimum or no flow through the valve) position. The rotating ball can also be positioned between either the full open or the full closed position, i.e., in one or more intermediate positions. The positioning of the ball or plug in a valve can be by means of a manual device, such as a lever or worm gear, operating on an extension of the ball or plug outside of the pressure boundary of the valve body/bonnet. The positioning can also be accomplished by non-manual means, such as by a pneumatic, hydraulic, or electrically powered actuator. The actuator positions the plug in response to an electrical or fluid signal. A valve plus a control device can be used to proportionally control the flow of fluid in response to an input signal.

Figure 1:
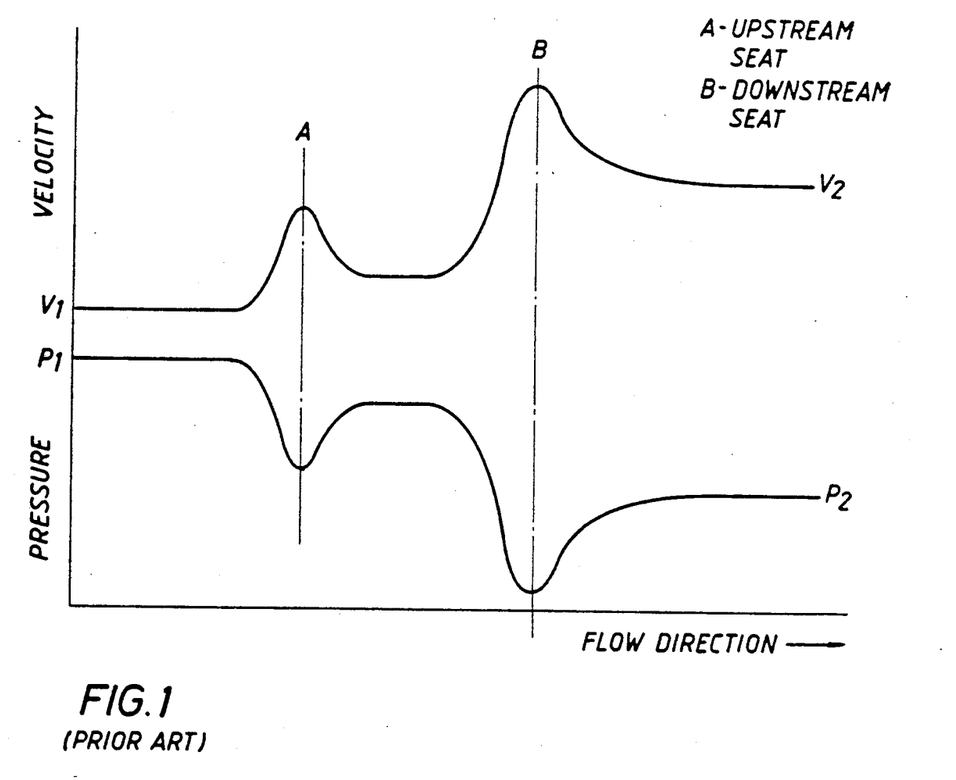
FIG. 1 is a graph known in the art.

As fluid passes through a rotary control valve assembly, and specifically past the upstream seat and the downstream seat, if the ball or plug is in a partially opened position the fluid undergoes a simultaneous pressure drop and velocity increase. This phenomena occurs if the ball/plug is in any intermediate position between the full open and full closed positions sufficient to permit fluid flow. A pressure and velocity profile through a partially opened, typical rotary control ball valve is exhibited in FIG. 1. These velocity and pressure profiles have been described in fluid flow texts as well as in the published data of a number of valve companies. Essentially, the fluid must obey the following fluid flow law:

$$\frac{P_1 V_1}{T_1} = \frac{P_2 V_2}{T_2}$$

The fact that the pressure and velocity profiles take marked dips or jumps when traversing the seats of the valve, as illustrated in FIG. 1, can be disadvantageous. For example, any dip in pressure below the vapor pressure of a particular liquid fluid can cause the formation of gas bubbles in the fluid. As the fluid pressure then increases (downstream of the locations where the pressure level is the lowest and the velocities are the highest) the vapor bubbles then collapse. The phenomena is known as cavitation. If gas flow only is present, the locations within the valve embodiment that cause large velocity steps (increases) generate noise and vibration. Both cavitation and vibration are detrimental to the valve and piping components, sometimes doing extensive damage. Noise can be detrimental to the environment. In fact, the maximum noise to be tolerated, measured in decibels, can form a design limitation for an application of a valve.

Noise and/or vibration abating valves are ones that allow or cause the aforementioned steps in pressure drop, or jumps in velocity increase, to be accomplished in a multiplicity of small steps rather than in one or two large steps. The fact that pressure increases after passing each restriction point, and that the amount of this pressure increase is relatively large (high) for a typical rotary control valve generating the data of FIG. 1, has given the term "high recovery" to this rotary valve. As mentioned above, the "high pressure recovery" phenomena may cause cavitation or noise generation. If by mechanically modifying the valve flow passages a more idealized flow through the valve can be achieved, then the adverse affects of the "high recovery" basic valve can be modified to qualify the valve as a "low recovery" device.

Other types of valves can be "low recovery" devices. Such devices, for example, as "chokes," commonly used in oil and gas production, are considered to be inherently "low recovery" devices.

The rotary control valve, notwithstanding its typical high recovery characteristics, does have major advantages compared to other types of control valves. One of the major advantages is that it can successfully control fluid over a wide range of flows. Another way of stating this is that the ratio of maximum to minimum flow (called "rangeability") of a rotary control valve can be very high. The "rangeability" can be a ratio of eighty to one (80/1) up to three hundred to one (300/1) in a ball valve.

An ideal embodiment of a rotary control valve combines the advantage of "wide rangeability" with the desirability of "low recovery" so that the device can be utilized over a wide range of flows without the adverse affects of cavitation or noise.

Several fluid flow control embodiments have combined rotary control valves with trim modifications to reduce the pressure recovery characteristics. The approaches used have either involved an upstream plate (to cause a pressure drop before the rotary element), or a trim within the rotating ball (or plug) to create a higher impedance to flow (multiple pressure drops) when the ball is in the throttling (intermediate) position, or a downstream trim to cause a pressure drop at the valve outlet. Some embodiments have used two of these in combination.

U.S. Pat. No. 3,630,229 (Nagle) recognizes that a multiple arrangement of parallel tubes combined with a rotating ball element is a more effective means of reducing noise and cavitation than a full-sized outlet bore would be. Similar concepts have been used by other manufacturers (Fisher and Neles, for example) in the form of tube bundles on the outlet side of segmented ball valves or inlet baffles combined with a special trim within the ball. A number of manufacturers have recognized that the noise/cavitation of a valve can be reduced if not all of the pressure drop is taken across the moving control element. Inlet and outlet trims, consisting of perforated tubes, tube bundles, orifices, and even outlet diffusors have been used in, and/or in configuration with, valve control elements in order to divide the pressure drops across the valve into more steps. In gas flows, it is not uncommon to utilize expanded outlets for the valve to increase the outlet area, thus reducing the velocity (and noise) that would otherwise result.

This invention teaches a novel arrangement of inlet/outlet trims and a matching rotating plug/trim that includes the alignment of the openings of cylindrical ducts located in the inside face of a fixed inlet trim, (and/or of a fixed inlet and outlet trim) with the openings of cylindrical (intercommunicating) ducts in the face of a rotary control plug. The ducts and the openings in the faces of the fixed trim and rotating elements combine to greatly increase the effectiveness of the valve in reducing noise and cavitation. The specific reason for the improved performance is the added effectiveness of the "series" and "paralleling" combination chokes operating in conjunction with the variable impedance of a rotating plug/trim. Such an arrangement could include, in addition, enlarging the opening capacity of the ducts in the downstream face of the outlet trim.

It has been found that the combination in the present invention of cylindrical ducts in inlet/outlet trims and matching intercommunicating cylindrical ducts in a rotating plug/trim reduces noise generation substantially. This is achieved by combining the behavior of "chokes" and the "variable impedance" of a rotating plug/trim. The assembly acts as a combination of variable chokes. In particular, in the near open position, when the rotating plug/trim becomes markedly less effective in reducing noise and cavitation, the near alignment of the cylindrical ducts allows each to act effectively as a variable choke in the flow range where the rotating plug/trim, by itself, is least effective.

The invention further permits particles, up to the size of the duct diameter, to pass through the valve, thereby permitting the valve to be used in applications that involve contaminated fluids. It has been found that the duct diameter may be $\frac{1}{4}$ of an inch or larger will not significantly affect the low recovery characteristics of the valve. In certain fluids, particularly liquids, the arrangement can be bi-directional or multi-directional.

Further advantages of the design as specified in the preferred embodiment will be readily appreciated. For instance, the design provides for the preservation of the alignment of the inlet and outlet trims to assure the line up of the duct openings. The design provides for the removal and reinstallation of each of the trim components through the bonnet of the valve. The design provides for expansion and contraction of the trim elements relative to other portions of the valve assembly. The design arranges that the flow does not bypass the intended trim element ducts. The design allows for using appropriate wear resistant materials for the insertable trims.

DESCRIPTION OF PRIOR ART

U.S. Pat. No. 3,630,229 to Nagel teaches a device for quietly throttling the flow of a fluid stream that includes inserting a plurality of parallel tubes into the flow path adjoining a ball valve at one end of the tubes, the ball valve having a simple full bore. Nagel further teaches frictionally resistant tubes and vibration absorbing packing surrounding the space between and around the tubes in order to achieve the quiet throttling effect.

U.S. Pat. No. 3,773,085 to Caldwell; U.S. Pat. No. 3,776,278 to Allen; U.S. Pat. No. 3,880,399 to Luthe; U.S. Pat. No. 3,941,350 to Kluczynski; U.S. Pat. No. 3,978,891 to Vick; U.S. Pat. Nos. 3,813,079 and 3,665,965 to Baumann; U.S. Pat. No. 3,990,475 to Myers; U.S. Pat. Nos. 3,693,659 and 3,722,854 to Parola; and U.S. Pat. No. 3,704,726 to Lewis all teach the insertion of attenuating means in the flow path in order to alleviate the noise associated with throttling high pressure fluids. The attenuating means taught varies from simple ducts and perforated disks means to accomplish complex tortuous paths. The means are adapted for reciprocating valves.

U.S. Pat. No. 3,826,281 to Clark teaches unitary attenuating means inserted as a trim inside of a rotating ball valve.

U.S. Pat. No. 4,479,510 to Bey; U.S. Pat. No. 4,364,415 to Polon; European Publication 325,846 to Marin; and U.S. Pat. Nos. 4,665,946 and 4,212,321 to Hulsey teach attenuating means that force the fluid to take a tortuous path through a rotating plug/trim element.

In the explanatory material supplied with respect to the Neles Q-ball with downstream diffusor, Neles teaches a modification of their basic valve construction that adds a special attenuator piece in the valve body. The extra trim taught is comprised of a baffle that may extend partially or totally across the conduit. The baffle openings are not dimensioned to match the openings in the ball trim.

None of the above art teaches an improved low recovery rotary control valve including a combination of series and paralleling chokes operating in conjunction with a variable impedance offered by and within a rotating plug.

SUMMARY OF THE INVENTION

This invention comprises a rotary control valve for controlling fluid flow through a conduit that includes a rotatable plug and at least a first trim element located in the conduit, the trim abutting the plug. Both the trim and the plug contain a plurality of ducts extending therethrough. At least one transverse duct within the plug communicates between at least two of the plurality of ducts. The trim ducts extend from an outside face to an inside face, and the plug ducts extend from a first face to a second face. The inside face of the trim is dimensioned to closely conform to the first face of the plug. The location and dimension of the ducts on the inside face of the trim coincides with the location and dimension of the ducts on the first face of the plug. In a preferred embodiment, the ducts are cylindrical.

In one embodiment, the plug is a ball. The first and second plug faces are located 180° apart. In other embodiments, they may be located 90° apart.

In one embodiment, the cylindrical ducts through the plug and the trim have a cross sectional diameter of not less than $\frac{1}{4}$ of an inch. (Smaller or larger diameter ducts can also be used.) This permits the use of the valve in environments where the fluid is contaminated.

The length of a trim duct in the preferred embodiment is at least five times the duct's diameter.

The apparatus may include additional trim elements located in the conduit abutting the plug. These trims also have a plurality of cylindrical ducts extending from an inside face to an outside face. The inside faces of these trim elements are dimensioned to closely conform to faces of the plug. The location and dimension of the ducts on the inside face of these trim elements coincides with the location and dimension of the ducts on faces of the plug.

In one embodiment, the plug has no transverse communicating duct per se, but rather a second set of cylindrical ducts, at least one of which inter communicates with the first set of ducts, the second set of ducts also communicating with a third plug face. In this embodiment, the first and second face of the plug may be located approximately 180° apart. The first and third faces of the plug may be located approximately 90° apart. Alternately, the three faces may be located approximately 120° apart. These trim elements will abut the plug with the trim inside face duct openings registering with the plug face duct openings in the full open position.

BRIEF DESCRIPTION OF THE DRAWINGS

FIG. 11 is a schematic illustration of a configuration of ball, trim and ducts wherein the faces of the ducts through the plug element are located 120° apart.

DETAILED DESCRIPTION OF THE PREFERRED EMBODIMENT

Figure 2:
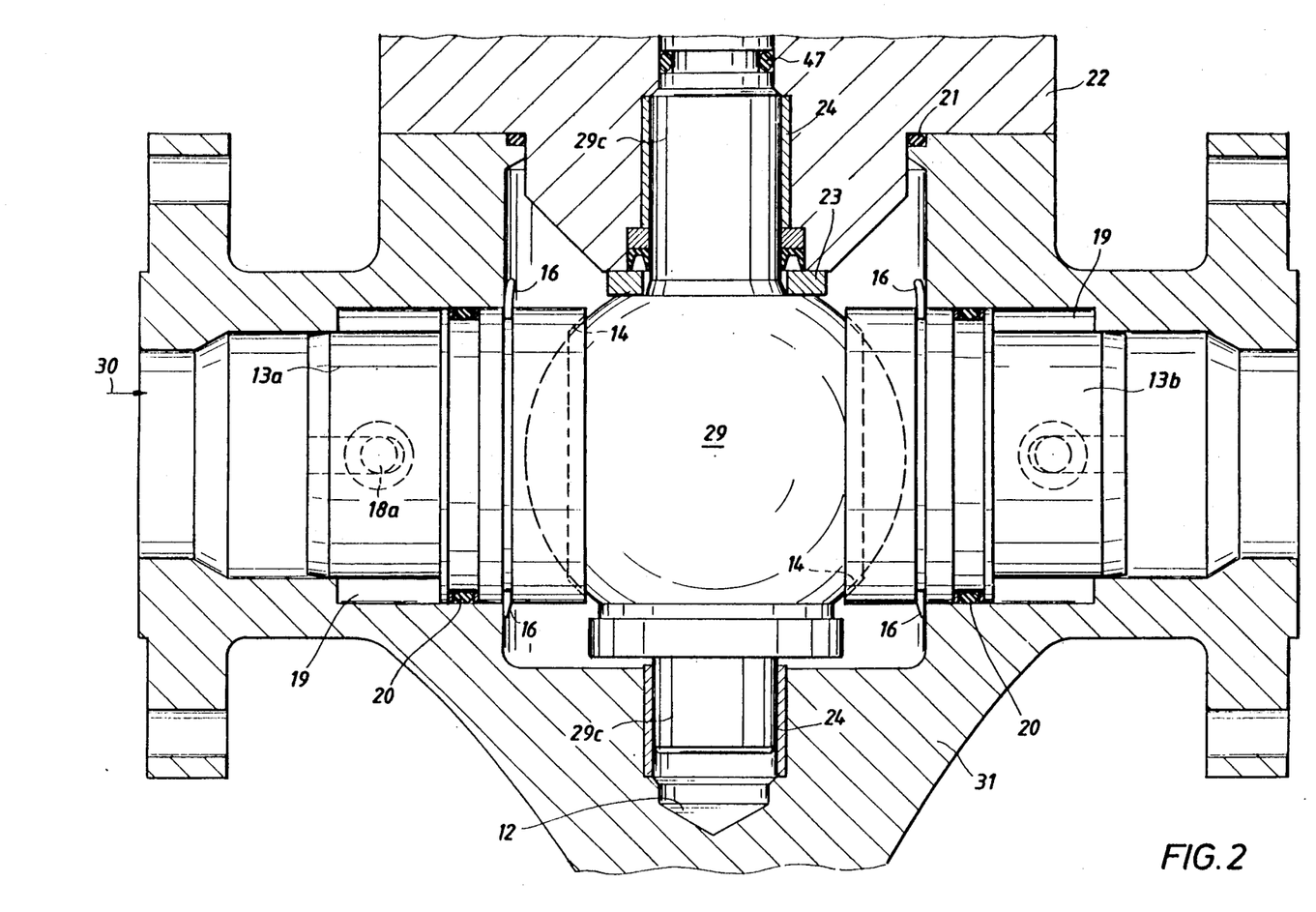
FIG. 2 is a partial cutaway view of a rotary control ball valve body with ball and trim.

Referring to FIG. 2, the preferred embodiment is comprised of a valve body 31 having flow passage (bore) 30 in which is fixed a rotating ball 29 positioned between upstream seat/trim assembly 13a and downstream 13b seat/trim assembly. It will be apparent that the valve may be designed to be bi-directional or multi-directional. "Upstream" in such case would be determined by the flow path. The seat/trims are sealingly engaged with mating surfaces on the valve body at 20 and are sealingly engaged with the rotating ball at 14. The particular arrangement shown has the seat/trim assemblies 13a and 13b preloaded against the ball via springs 16 which act between the seat assemblies 13a, 13b, and valve body 31.

Seals 20 shown between 13a and 13b and body 31 are designed to remain sealingly engaged between trim and body and can be of a number of types such as O-rings, lip seals, flexible metal mesh/graphite, or elastomer or metal bellows. The spring shown as 16 can be of several different types and could be set behind the trim 13 or as part of the seal arrangement on the circumference of 13.

Pressure from the valve bore 30 is allowed to pass from the bore to space 19 around the circumference of the seat/trim assemblies 13a, 13b. This pressure is prevented from bypassing the seat/trim assemblies 13a, 13b via a seal arrangement 20. In such a manner, the seat/trim assemblies 13a, 13b are pressure assisted in their seal against the ball 29.

Valve body 31 creates an enclosed flow bore 30 by means of bonnet 22. Bearings 24 are inserted between bonnet 22 and extension 29c of ball 29 such that the ball may rotate freely within the bonnet. Bonnet 22 is sealed against body 31 by means of bonnet-to-body seals 21. Bonnet 22 seals against ball 29 by means of seals 23. Bearings 24 are further interspersed between the lower extension portion 29c of the ball and the body 31. The seal at stem/bonnet interface at location 47 (FIG. 2) completes the pressure boundary.

Figures 4A, 4B:
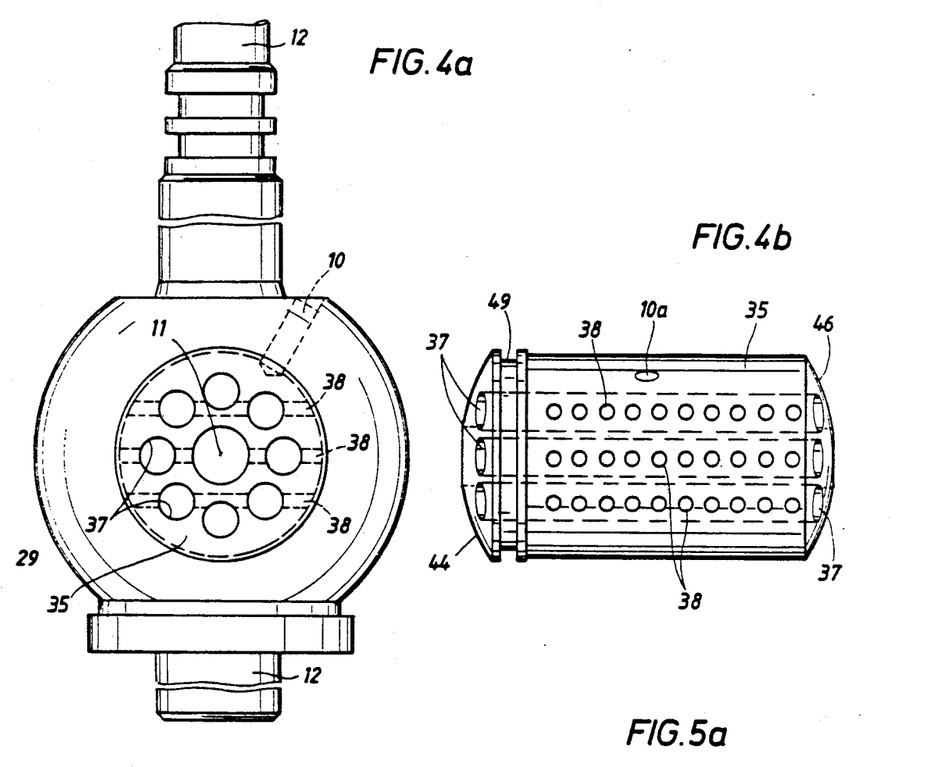
FIG. 4A is a elevational view of the ball and ball trim and FIG. 4B is an elevational view of the ball trim.
Figures 8, 9:
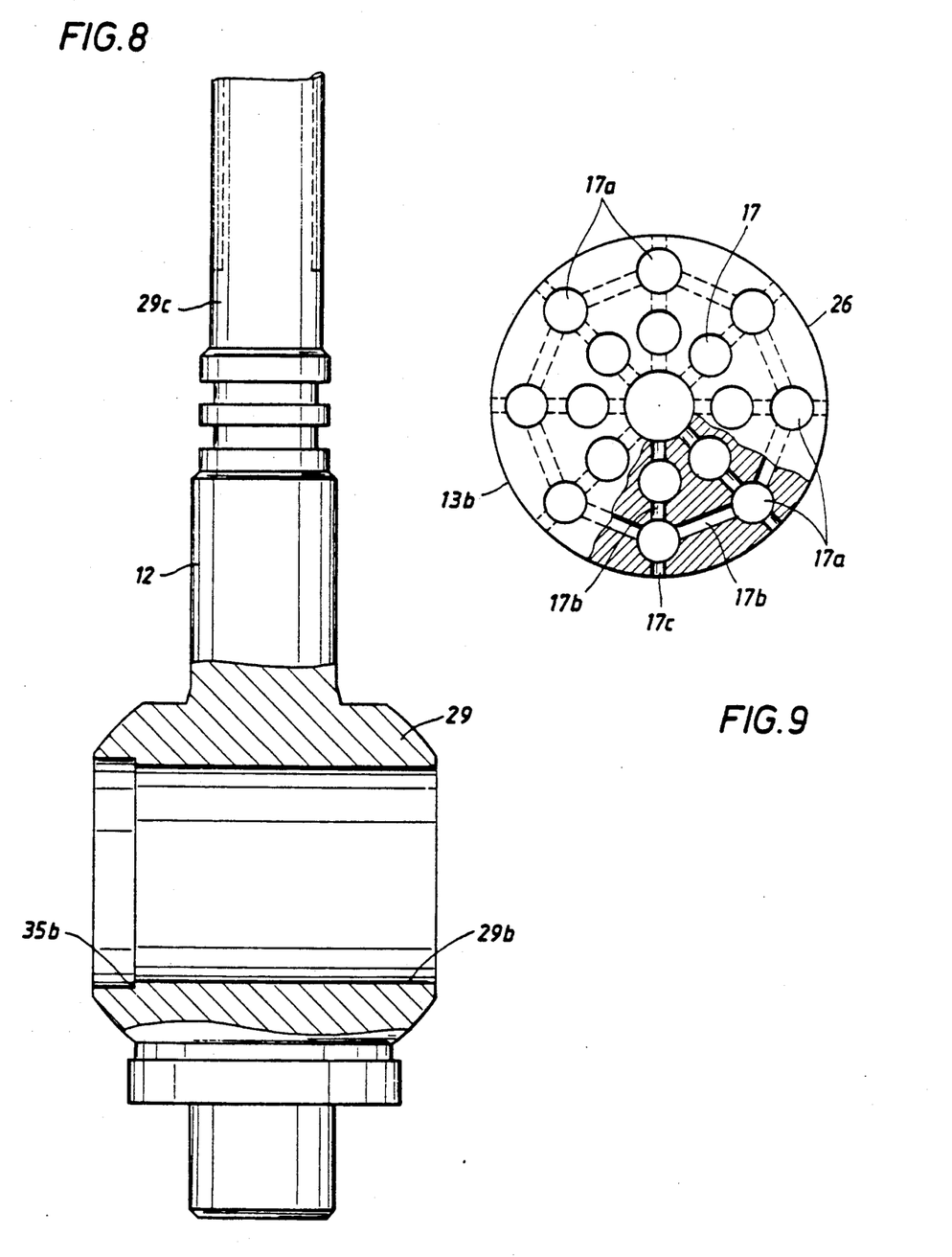
FIG. 8 is a partially cutaway view of the ball.
FIG. 9 is a view of the outside face of an alternate embodiment of the fixed trim with indications of interior connections.
Figure 10A:
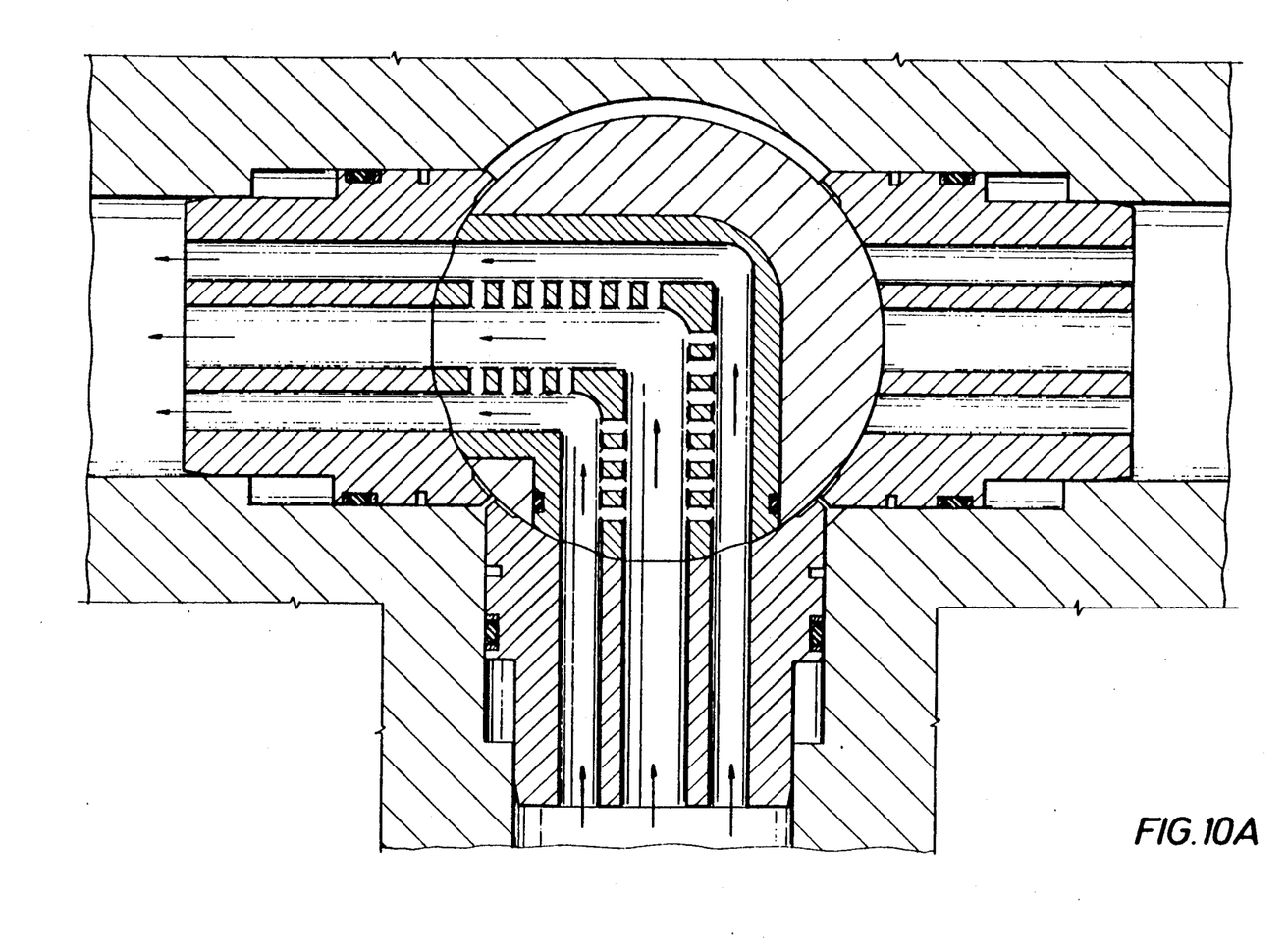
FIG. 10 is a schematic illustrating various configurations of ball, trim, and ducts.
Figure 10B:
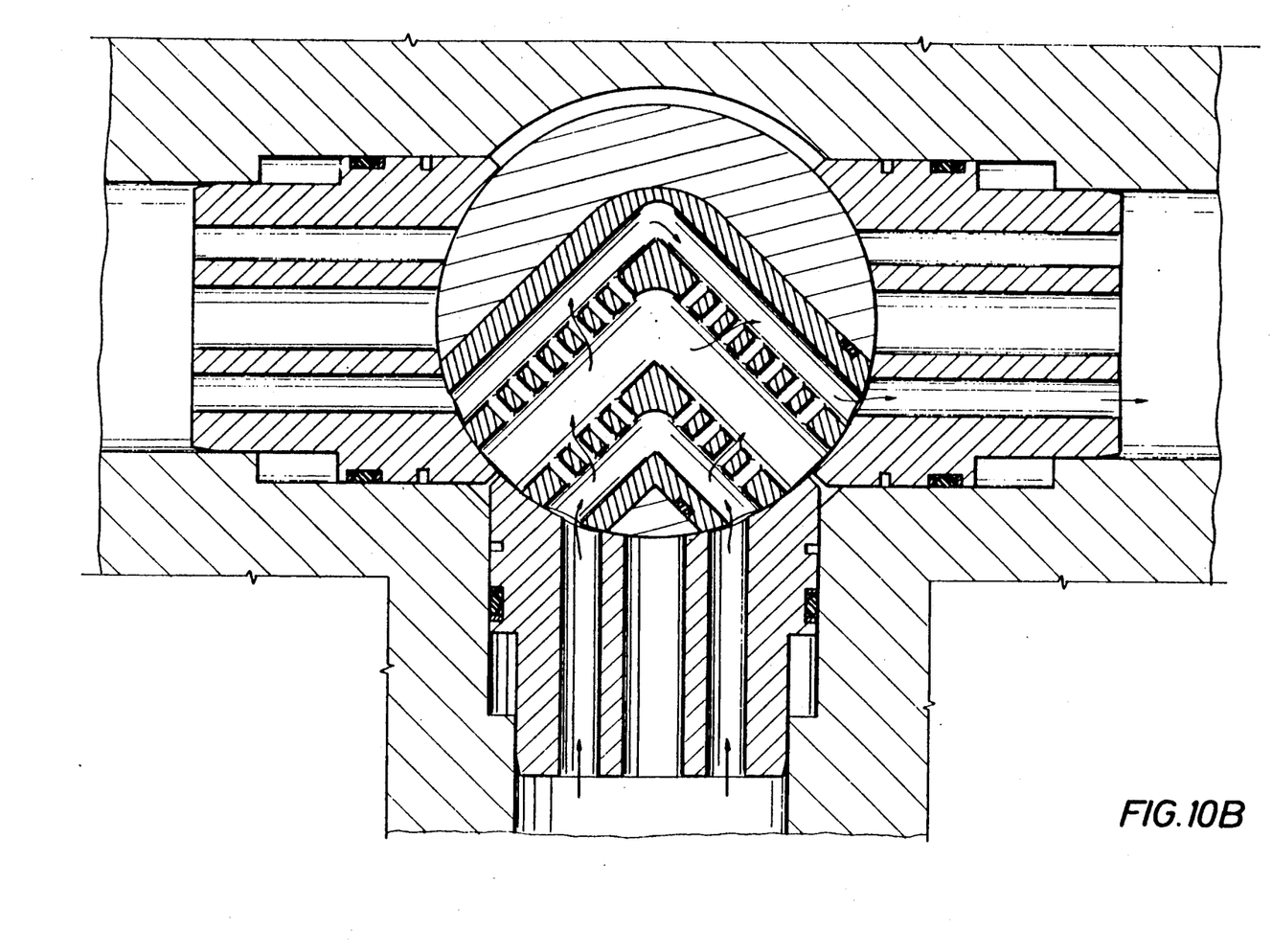
Figure 10C:
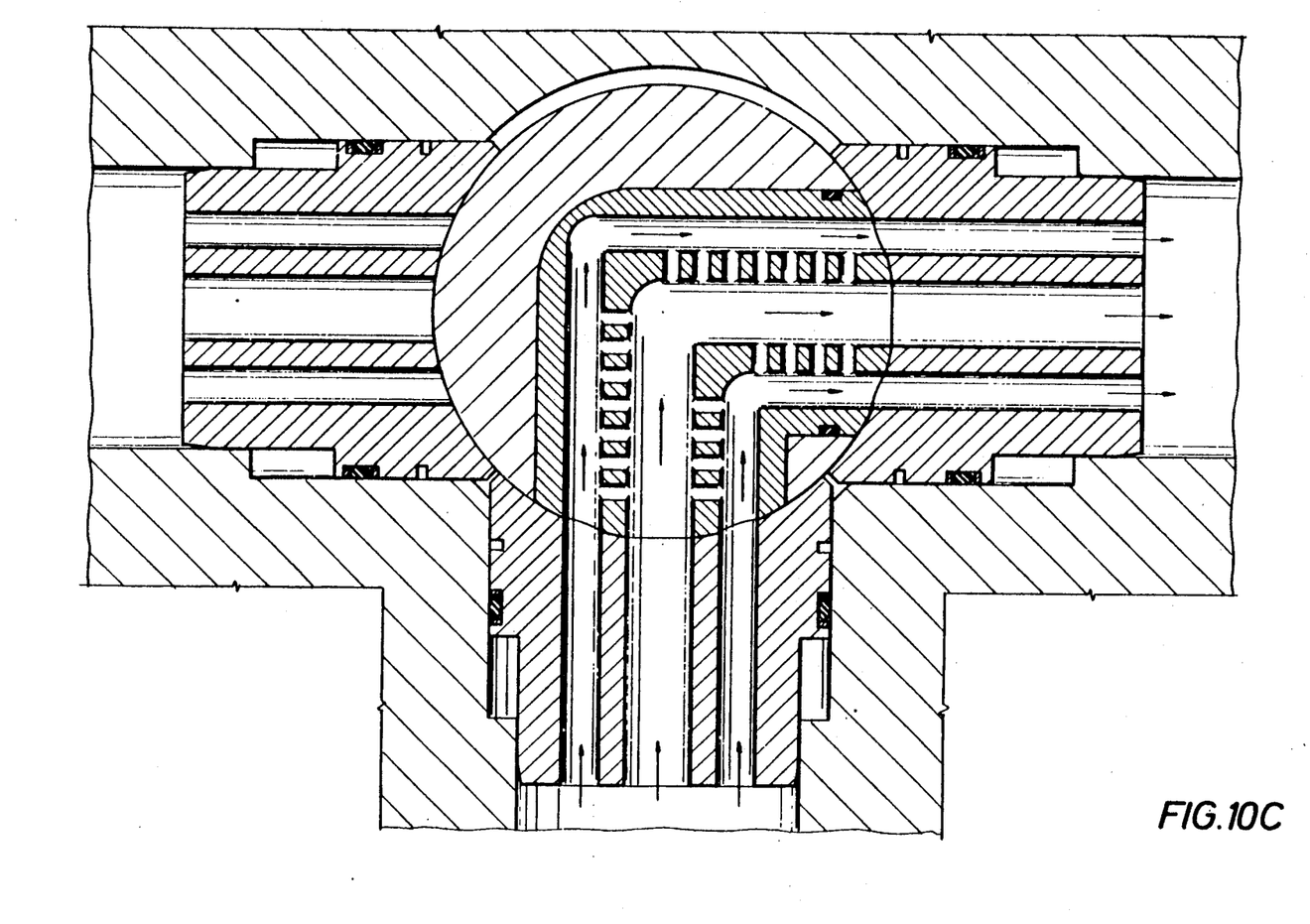

Referring to FIG. 4, the ball 29 of the preferred embodiment has incorporated within its bore a replaceable trim 35 which consists of a series of cylindrical ducts 37 running in the axial direction (parallel to the ball bore). The ducts could be drilled in the ball itself. Use of a removable and replaceable ball trim offers manufacturing and operating advantages. The ball trim also contains a series of transverse ducts 38 generally perpendicular to the ducts 37. The trim 35 is accurately located within the ball bore with faces 44 and 46 matching the sphere of the ball. The ball trim 35 is kept in position axially within the ball bore by means of a shoulder shown as 45a on trim 35 and shoulder 35b on the ball bore (FIG. 8). Rotation of the trim about its center longitudinal axis is prevented by means of a shoulder bolt engaging a corresponding trim recess 10. The rotation could also be prevented by means of a key or other suitable means. With the trim 35 so retained in ball 29, and fluid bypass between the ball bore and trim 35 prevented by a seal located at location 49, the ball and trim operate as an integral assembly.

Figure 6:
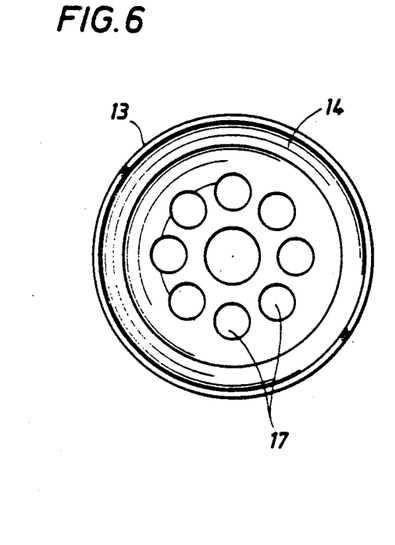
FIG. 6 is a cutaway view from the front of the fixed trim.
Figure 7:
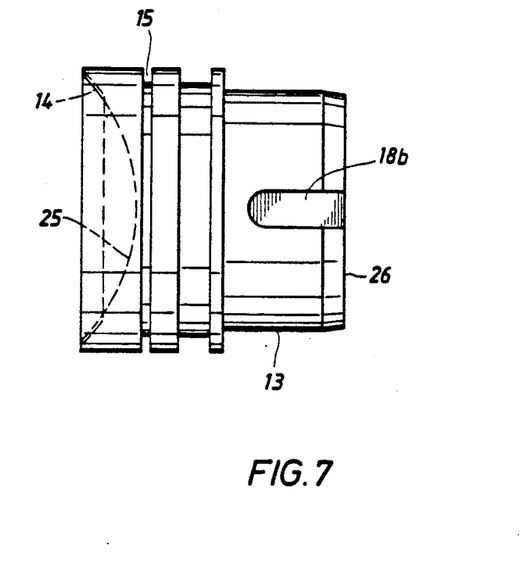
FIG. 7 is a cutaway view from the side of the fixed trim.

Referring to FIGS. 6 and 7, trim 13, which could comprise either upstream trim 13a and/or downstream trim 13b in most embodiments, is shown having a plurality of cylindrical ducts 17 running from an inside face 25 to an outside face 26. Annular element 14 indicates the seal by means of which inside face 25 seals against the face of the ball/trim 29/35. Trim alignment guides 18a in body 31 and 18b in trim 13 offer one means to secure the rotational alignment of the trim within the body. A bolt inserted through aperture 18a in body 31 registers in slot 18b of trim 13. Trim element 13 and ball trim element 35 are dimensioned such that the opening of cylindrical ducts 17 on the inside face of trim element 13 will register, or match, with the opening of cylindrical ducts 37 on one face of trim element 35 when the faces are in alignment.

FIG. 8 illustrates the ball element 29 of the preferred embodiment together with its extension portion 29c that extends out of valve body/bonnet 31/22. Various manual, hydraulic, or electric means for controlling the rotation of the ball (not shown but known in the art) may be connected to extension 29c. The rate of rotation and angular position of the ball 29 may be varied to suit system flow requirements. For instance, the rate of rotation of the ball when the ball begins to open might be slower than the rate of rotation when the ball moves further toward full open position.

As illustrated in FIG. 9, outside face 26 of downstream trim element 13b may be modified by adding additional cylindrical ducts 17a that communicate with outside face 26. Additional ducts 17a will communicate between themselves and with ducts 17 by means of transverse ducts 17b. Transverse ducts 17b might be radially transverse ducts or annularly transverse ducts, both of which are exhibited in FIG. 9. The provisional of additional openings in outside face 26 permits flow through the downstream trim to further diffuse. Alternately, the openings of ducts 17 in face 26 could be enlarged.

View A—A in FIG. 2, shown as FIGS. 5a, 5b, 5c, and 5d, is a cross sectional view through the valve bore along the flow line. FIGS. 5a, 5b, 5c, and 5d show the same sectional view except that the ball/trim assembly is rotated in different positions.

Figure 5A:
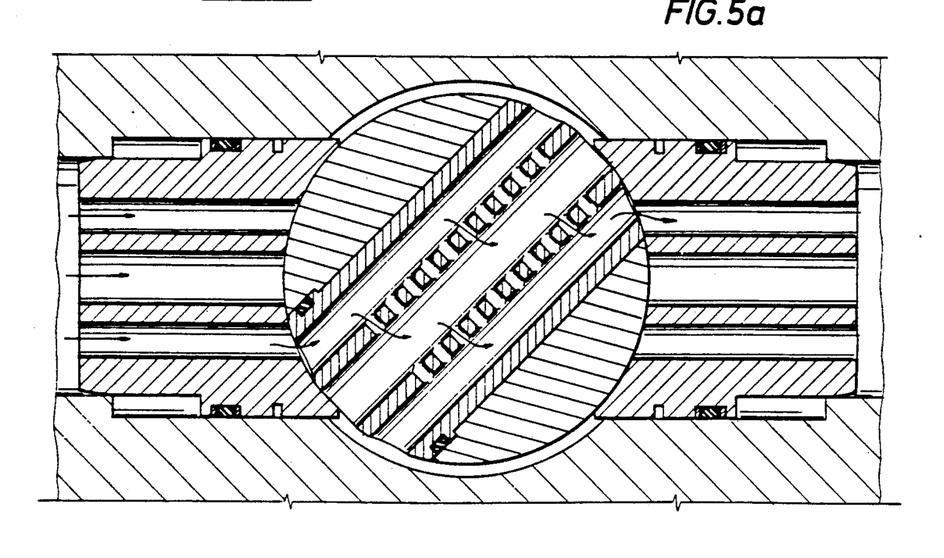
FIG. 5 is a schematic illustration of various positions of the ball and trim.
Figure 5B:
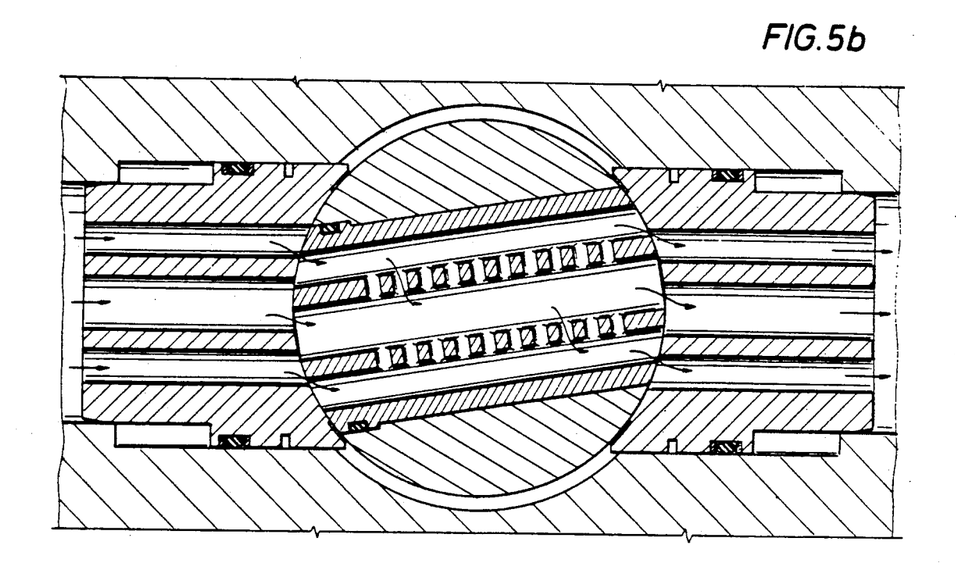
Figure 5C:
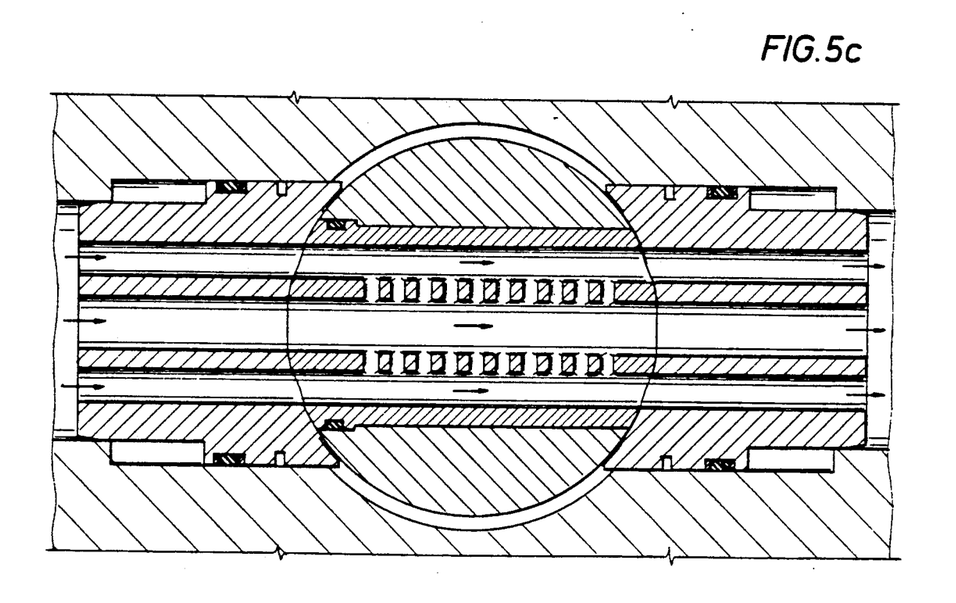
Figure 5D:
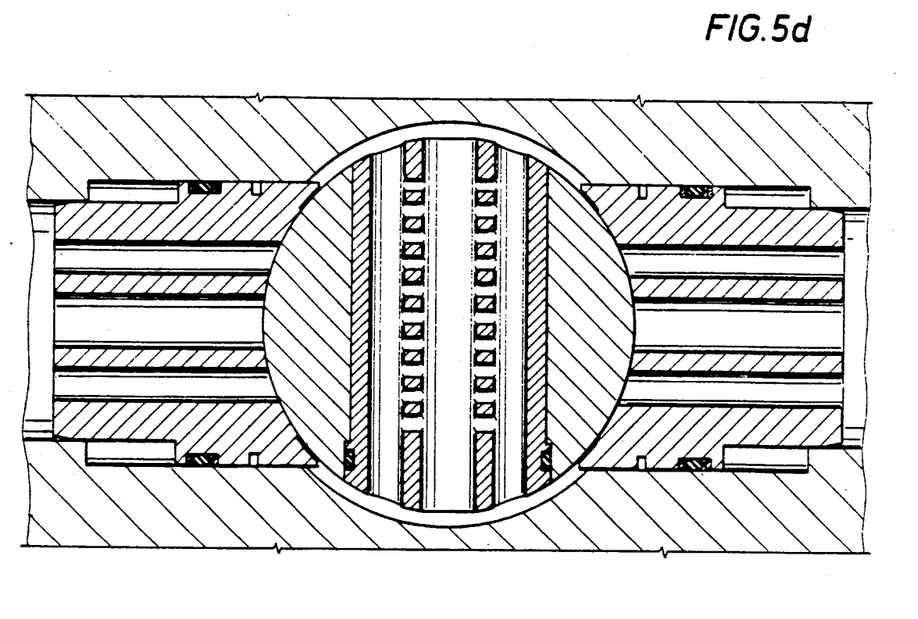

In the various positions of trim 35, illustrated in FIGS. 5a, 5b, 5c, and 5d, the ball/trim faces 44 and 46 remain in close proximity to corresponding inside faces 25 of the mating (and non-rotating) seat/trim assemblies. The seat surfaces 14 remain slidingly engaged with the ball/trim sphere, including the surfaces noted as 44 and 46. In the preferred embodiment, surfaces 25 have a slight relief (on the order of a few thousandths of an inch) to assure that there is sufficient ball/seat loading for shut off and valve cavity isolation in the full closed or full open position. When the ball/rotating trim 29/35 is in the full closed position, as illustrated in FIG. 5d, the seat/trim assemblies are preloaded via spring 16 against the ball spherical surface 29a. This loading is pressure assisted because of line pressure in cavity 19. In this position, seat surfaces 14 engage ball surfaces 29a and fluid shut off results.

As the valve ball/trim 29/35 starts to rotate open, illustrated in FIG. 5a, fluid on the upstream side of the valve, noted as A, begins to flow through the cylindrical ducts 17 in trim assembly 13a and then through the first exposed cylindrical duct 37 in rotating trim 35. As the particular duct in trim 35 is not exposed to the inside face 25 of outlet trim 13b, the fluid must traverse the ducts 37 in trim 35 via the cross flow passages 38 provided. This process of changing flow direction causes corresponding drops in pressure and increases in velocity as the fluid passes from the inlet to the outlet sides of the trim 35. Thus, a series of step changes occurs. With the trim shown in position 5a, the fluid must traverse the maximum number of axial holes 37 via transverse holes 38. Passage through inlet duct 17 secures an initial pressure drop. Outlet trim ducts 17 effect a final pressure drop. The just opened position illustrated in 5a would be the position offering greatest impedance to flow. As the ball/trim 29/35 continues to rotate to the open position, more of the plug's cylindrical ducts 37 are exposed to the inside faces 25 of upstream and downstream trims 13a and 13b and the ducts 17 in trims 13a and 13b. This is illustrated in FIG. 5b. In the position 5b, there is less impedance to flow than in the position of 5a, the just opening position. In the preferred embodiment, the rotational movement of the ball from the closed position of 5d to the just opening position of 5a may take place more slowly than the rotational movements from positions 5a to 5b and 5c. Such could be programmed into the valve's actuator/positioner to obtain optimum noise abatement. As the trim rotates to the open position, the cylindrical ducts 17 in inlet/outlet trims 13a, 13b are successively exposed to cylindrical ducts 37 in trim 35. Because of the close sliding engagement between the ball sphere 29a and matching trim surface noted as 44 and 46 on trim 35, fluid passing through the trim 13a is restricted from bypassing a trim flow duct 37 on trim 35. The fluid must traverse the cylindrical ducts 37 in trim 35, via the transverse passages 38, if necessary.

The cylindrical ducts 17 in trims 13a and 13b have no transverse passageways in the embodiment shown in FIG. 5. Because the length of these axial passages 17 is long relative to the diameter (greater than 5/1,) these passages act as chokes. As these passages are successively covered or exposed to passageways on trim 35, both on the upstream and on the downstream side, the rotating ball/trim 29/35 acts as the control element for varying the flow through the passages 17, the arrangement thereby behaving as variable chokes.

As the ball/trim 29/35 moves to the full open position, shown in FIG. 5c, the trim assemblies 13a, 35, and 13b form a series of parallel chokes. Cylindrical ducts 17 in the inside faces of the inlet and outlet trims become aligned with corresponding ducts in faces 44 and 46 of trim 35. The arrangement described thus combines the inherent low recovery characteristics of the choke with the rangeability of a rotary valve equipped with a suitable variable impedance trim to become itself a low recovery control device. When the trim nears the full open position so that the ducts 37 are correspondingly aligned, or partially aligned, with the corresponding ducts 17 in 13a , and 13b, the effective length of each choke is the sum of the lengths in each trim component. This presents an effective control of the choke/rotary trim combination in the near full-open position of the rotary trim, allowing for control of noise and cavitation in a degree of opening position previously difficult to control.

Note that the trims 13a, 13b, and 35 are aligned to the valve body and rotating element, respectively, so that, when full-open, all cylindrical ducts in mating faces are in alignment. One purpose is to maximize flow (minimize resistance to flow) and to allow particles in the fluid to pass through the trim up to a size very near the size of the axial passages 37 and 17. If the ducts were not aligned, the size of particles that could pass would be much smaller and could even prevent operation of the valve. Misalignment would also reduce the assembly's effectiveness as a choke. Note also that the trims 13a, 13b, and 35 are positioned to maintain axial alignment but are mechanically arranged so that each may mechanically (physically) expand or contract either radially or longitudinally within valve body 31 so that thermal shock will not bind the components or prevent sealing engagement of the trims 13a, 13b to the valve body 31 or ball sphere 29. The same is true of trim 35. It is positioned in the ball so that it can expand in the axial direction and can also expand in diameter (radially) without jamming against the ball bore 29b. Its axial position in the bore is maintained by location shoulders, shown as 45a, 35b. This locating means could also be by means of a lock ring or some other suitable means.

With the arrangement shown and bonnet 22 removed, seat/trims 13a, 13b can be retracted by recovering spring/retracting means 16 and moving the trim elements away form the ball through use of space 19. This allows the ball/trim 29/35 to be removed. Subsequently, the fixed trim elements can be removed through the bonnet opening.

Figure 3:
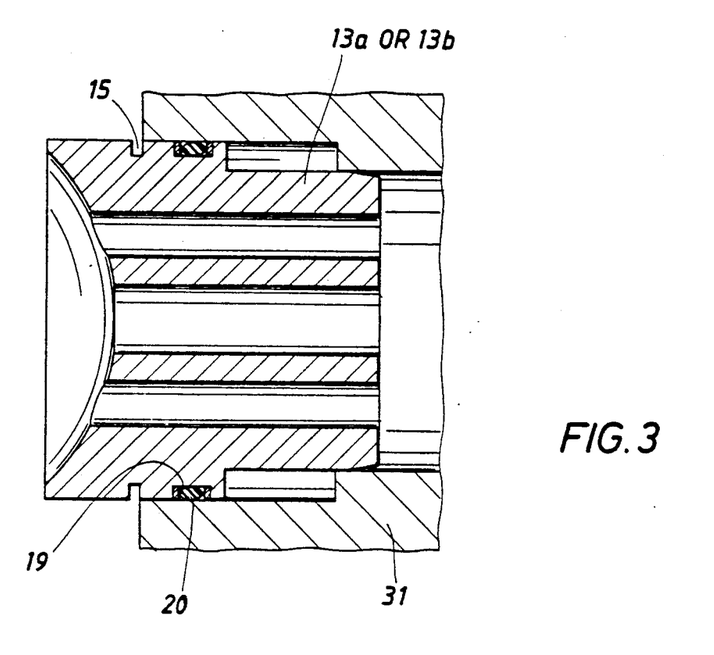
FIG. 3 is a cutaway view of a detail of the fixed trim.

If flow conditions allow an arrangement of trims requiring only the inlet and ball trims, the outlet trim 13b could be eliminated. This would permit a simpler upstream seat seal arrangement, as noted in detail on FIG. 3. The ball trim 35 could actually be inserted through the bore of the valve on the downstream side. The outlet end of the trim could be truncated to align with the ball port (without the spherical radius on the outlet side). This would allow easy ball/trim insertion by simply putting the ball in the valve with truncated ball toward the seat and then rotating the ball 180° to engage the spherical ball/trim surface with the seat. This would permit an expanded outlet in the case of gas flow but would still retain the effectiveness of the series parallel combination of chokes and variable impedance rotary trim previously described.

Having described the invention above, various modifications of the techniques, procedures, material and equipment will be apparent to those in the art. It is intended that all such variations within the scope and spirit of the appended claims be embraced thereby.

What is claimed is:

1. A rotary control valve for controlling fluid flow through a conduit comprising:

a plug element rotatable in the conduit having a plurality of ducts extending through the plug from a first face to a second face and at least one transverse duct communicating between at least two of the plurality of ducts, the transverse duct and the said two ducts defining fluid flow paths therethrough, the average cross sectional area of the flow path of the transverse duct being less than the average cross sectional area of the flow paths of the said two ducts;

a first trim element located in the conduit abutting the plug, having a plurality of ducts extending from an outside face to an inside face, the inside face being dimensioned to closely conform to the first face of the plug; and wherein the location and dimension of the ducts on the inside trim face coincide with the location and dimension of the ducts on the first plug face.

2. The apparatus of claim 1, wherein the trim ducts and the plug ducts are cylindrical.

3. The apparatus of claim 2, wherein the diameter of the cylindrical ducts of the trim and the cylindrical ducts of the plug is not less than ¼ inch.

4. The apparatus of claim 1, wherein the length of the ducts of the first trim element is at least five times the average breadth of said ducts.

5. The apparatus of claim 1, wherein the plug element is a ball.

6. The apparatus of claim 1, wherein the first and second face on the plug are located 180° apart.

7. The apparatus of claim 1, wherein the first and second face on the plug are located 90° apart.

8. The apparatus of claim 1 that further includes a second trim element located in the conduit abutting the ball, having a plurality of ducts extending from an outside face to an inside face, the outside face dimensioned to closely conform to the second face of the plug, and wherein the location and dimension of the ducts on the inside face of the second trim element coincides with the location and dimension of the ducts on the second face of the plug.

9. The apparatus of claim 1 wherein, the first and second face on the plug are located 120° apart.

10. A rotary control valve for controlling fluid flow through a conduit comprising:

a plug element rotatable in the conduit having a plurality of ducts extending through the plug from a first face to a second face and at least one transverse duct communicating between at least two of the plurality of ducts, the transverse duct and the said two ducts defining fluid flow paths therethrough, the average breadth of the flow path of the transverse duct being less than one half the average length of the said two ducts;

a first trim element located in the conduit abutting the plug, having a plurality of ducts extending from an outside face to an inside face, the inside face being dimensioned to closely conform to the first face of the plug; and wherein the location and dimension of the ducts on the inside trim face coincide with the location and dimension of the ducts on the first plug face.

11. The apparatus of claim 10, wherein the trim ducts and the plug ducts are cylindrical.

12. The apparatus of claim 11, wherein the diameter of the cylindrical ducts of the trim and the cylindrical ducts of the plug is not less than ¼ inch.

13. The apparatus of claim 10, wherein the length of the ducts of the first trim element is at least five times the average breadth of said ducts.

14. The apparatus of claim 10, wherein the plug element is a ball.

15. The apparatus of claim 10, wherein the first and second face on the plug are located 180° apart.

16. The apparatus of claim 10 that further includes a second trim element located in the conduit abutting the ball, having a plurality of ducts extending from an outside face to an inside face, the outside face dimensioned to closely conform to the second face of the plug, and wherein the location and dimension of the ducts on the inside of the ducts on the second face of the plug.

* * * * *